3 Sheets--Sheet 3.

D. S. MORGAN & T. MOTLEY.
Harvester-Rake.

No. 159,276.  Patented Feb. 2, 1875.

WITNESSES
Harry King
Wm. J. Peyton

INVENTORS
Dayton S. Morgan
Thos. Motley

By their Attorney
W. W. Baldwin

UNITED STATES PATENT OFFICE.

DAYTON S. MORGAN AND THOMAS MOTLEY, OF BROCKPORT, NEW YORK, ASSIGNORS TO DAYTON S. MORGAN, OF SAME PLACE.

IMPROVEMENT IN HARVESTER-RAKES.

Specification forming part of Letters Patent No. 159,276, dated February 2, 1875; application filed August 24, 1874.

*To all whom it may concern:*

Be it known that we, DAYTON S. MORGAN and THOMAS MOTLEY, both of Brockport, in the county of Monroe and State of New York, have invented certain new and useful Improvements in Harvester-Rakes, of which the following is a specification, reference being had to the accompanying drawings, which make part of this specification, and in which—

Figure 1:
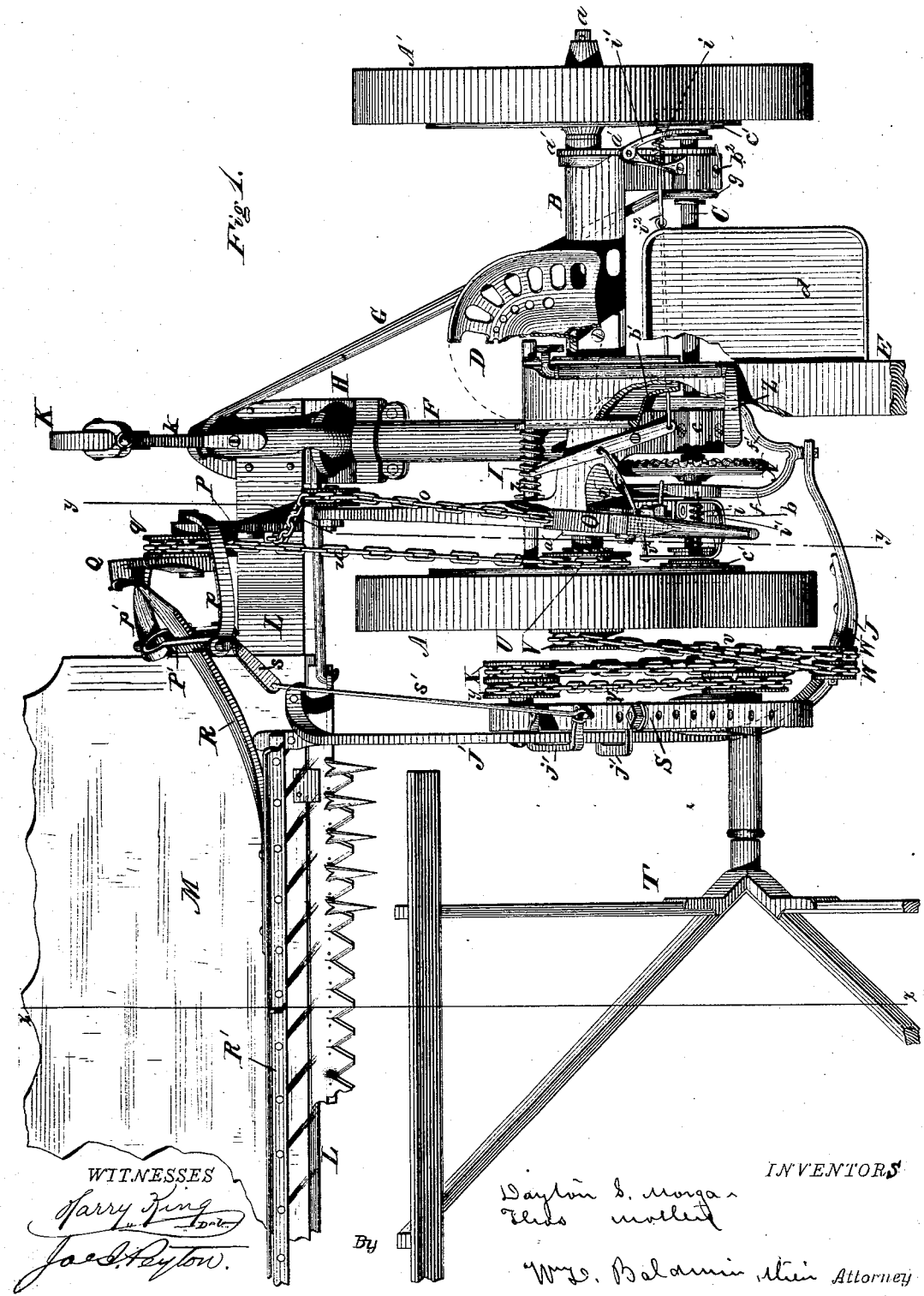
Figure 2:
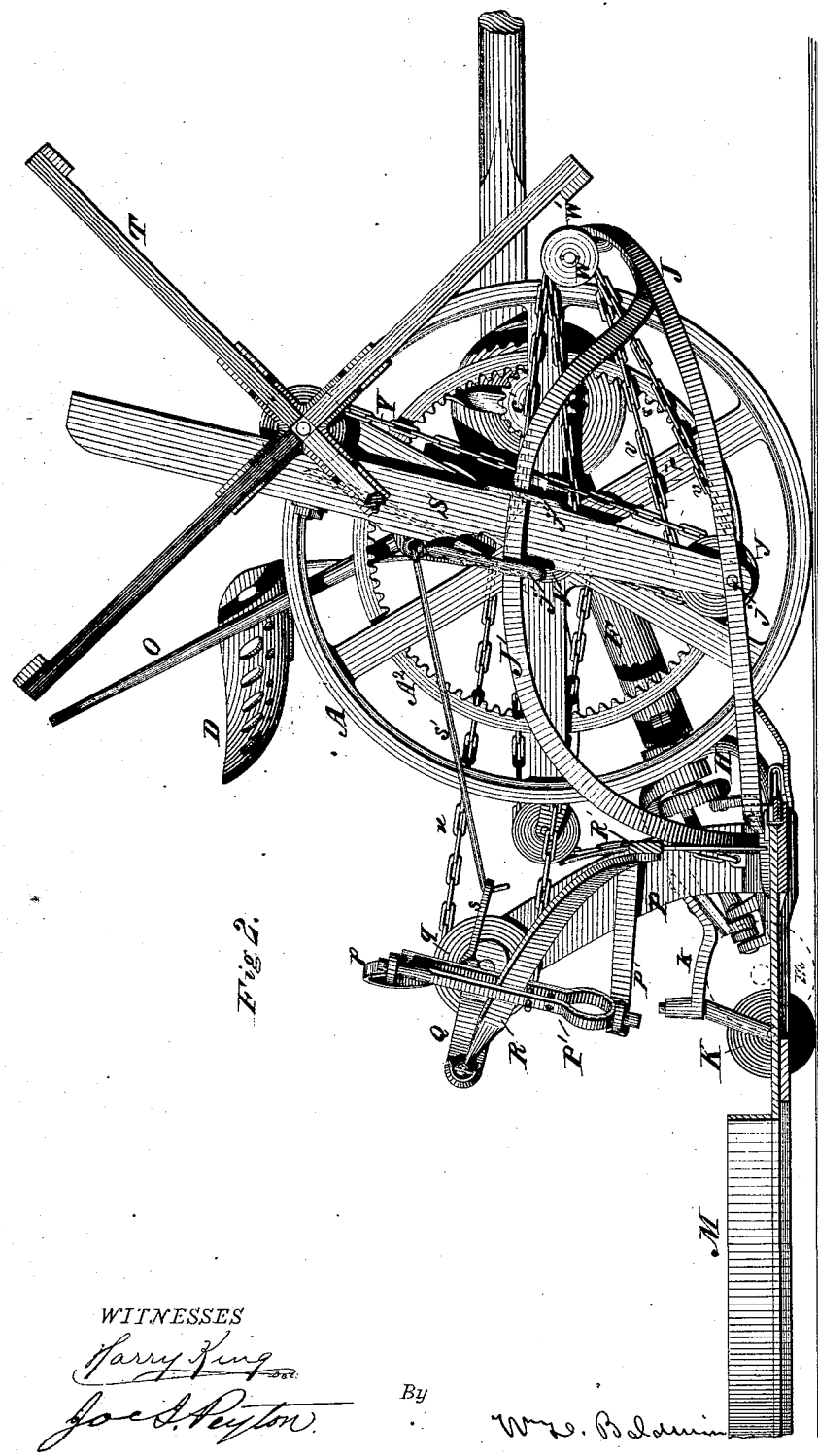
Figure 3:
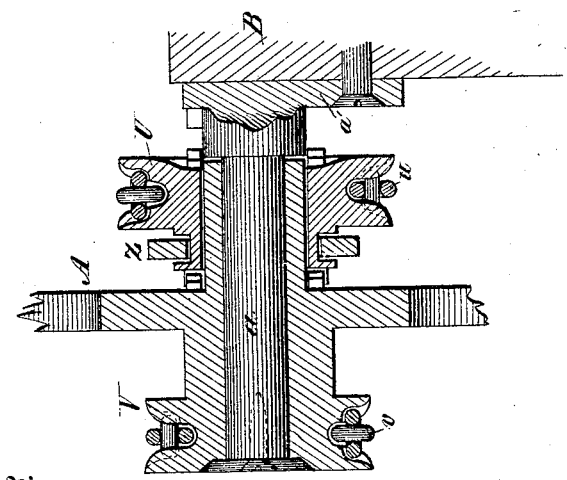

Figure 1 represents a plan or top view of so much of a two-wheeled hinge-joint harvester, with a self-rake mounted thereon, (in which all our improvements are embodied in the best way now known to us,) as is necessary to illustrate our invention. Fig. 2 represents a side elevation thereof, partly in section, on the line $xx$ of Fig. 1. Fig. 3 represents a vertical longitudinal axial section through the main axle, showing, on an enlarged scale, the details of the clutch mechanism for throwing the rake into and out of gear.

The nature of our invention, the objects sought to be attained, and the subject-matter claimed hereinafter will be specified.

Two main driving and supporting wheels, A A', turn freely on stud-axles $a$ projecting from sector-plates or radius-bars $a'$, capable of swinging round a counter-shaft, C, mounted upon a main frame, B, relatively to which the radius-bars may be adjusted, and held in such adjusted position, by means of holes in the frame, through which, and through corresponding holes in the radius-bars, pins may be passed to lock the parts together. A seat, D, for the driver is mounted upon the main frame, as usual, and a tongue, E, projects from said frame. A foot-board, $d$, is secured to the tongue. The counter-shaft C turns in pipe-box bearings resting in sockets in the arms $b$ $b^1$ $b^2$ of the main frame. The radius-bars $a'$ are mounted on the projecting ends of these pipe-boxes, thus relieving the counter-shaft from strain. The boxes are made in sections, the better to enable the counter-shaft to be removed or inserted. A tubular drag-bar or coupling-sleeve, F, is pivoted upon the counter-shaft, its upper end being bifurcated, and its forks $ff'$, provided with eyes, which fit on shoulders on the pipe-box bearings above mentioned, whereby the strain is taken from the counter-shaft. The coupling-sleeve is divided longitudinally, in order the better to admit of the removal or replacement of the crank-shaft which is inclosed therein. A shoe, H, is pivoted upon the coupling-sleeve in a well-known way, and a finger-beam, L, is secured to this shoe. A coupling-arm or brace-bar, G, is pivoted in rear to the shoe, while the forks $g$ of its front end embrace a collar on the pipe-box bearing, thus preventing strain on the counter-shaft. A drag-bar, J, extends from the finger-beam outside of, and around, the inner driving-wheel A, being curved inward in front thereof, and pivoted upon the reunited arms or forks $ff''$ of the coupling-frame. The finger-beam is thus securely braced against lateral strains while free to rise and fall, swinging around the counter-shaft as a center, and also to swing around the crank-shaft, so as to allow the divider-end to rise or fall freely, to conform to irregularities of the ground. The rear end of the coupling-frame is sustained by a caster-wheel, K, mounted on an arm, $k$, projecting therefrom. An internal spur-wheel, $A^2$, on each driving-wheel drives a corresponding pinion, $c'$, capable of moving freely endwise on the counter-shaft, and provided with a feather on its outer face, which feather engages with a transverse pin on the counter-shaft when the machine is advancing, but throws it out of gear when backing. Springs $i$, acting through pivoted arms $i^1$, which bear against the pinions, tend to keep them in gear. Links $i^2$ connect these spring-arms $i^1$ with a shipping-lever, I, pivoted on the main frame. A bevel-wheel, N, on the counter-shaft drives a corresponding pinion on a crank-shaft which drives the cutters by a crank and pitman, as usual.

The cutting apparatus and coupling-frame may be raised, lowered, or suspended, at any desired elevation, by means of a chain, $o$, hand-lever, O, pawl $o^1$, and detent $o^2$, of any usual well-known construction, Fig. 3.

The devices hereinbefore described constitute the machine when organized as a mower, and are not claimed herein, as they form the subject-matter of another application. To adapt it to use as a hand-raking reaper, it is necessary to add a platform, M, a grain-wheel, (shown in dotted lines, Fig. 2,) and a raker's stand or seat, all of which are well-known contrivances. In this instance an automatic rake is shown as adapted to the machine. This automatic rake is similar in its general features to that shown in Letters Patent No. 135,731, granted February 11, 1873, to Seymour and Morgan, as applied to a one-wheeled rigid-bar machine. The novel features herein claimed relate to the devices for adapting the rake to a hinge-joint machine.

A rake-post, P, mounted on the finger beam or shoe, carries bracket-arms $p$ $p'$, in which a slotted rake-stale support or guide, P', turns, and a crank-arm, Q, and pulley $q$. A rake-arm, R, swiveled in this crank-arm, and moving freely in the slot of the rake-stale support, carries a rake-head, R', to which a vibrating rising and falling movement is imparted, as is well understood. An arm, $s$, on the rake-stale support is connected, by a link, $s'$, with a reel-post, S, pivoted on the drag-bar J hereinbefore described. An overhung reel, T, of well-known construction, is mounted on this post, which latter vibrates on its pivot $j$ on the drag-bar, being supported and guided by means of loops $j'$, through which a supplementary brace, J', passes. This brace is united in front to the drag-bar, and in rear to the drag-bar, finger-beam, or platform, thus forming not only a support for the reel-post, but a skeleton-guard or compresser, to direct the incoming grain to the cutters. The rake is driven by means of a chain, $u$, passing from a sprocket-wheel, U, on the main axle, around a corresponding pulley, $q$, on the shaft of the crank-arm. The reel is driven by a chain, $v$, passing from a pulley, V, on the main axle, around pulleys W W', mounted on the drag-bar, and thence around a sprocket-wheel, X, mounted on the fulcrum of the reel-post. A separate chain, Y, runs from another sprocket-wheel, $y$, on this fulcrum, round a pulley on the reel-shaft, to drive the reel. The chain $v$, it will be observed, runs over the top of both the pulleys W W', which turn independently of each other, and in opposite directions.

By the above-described device the tension of the reel-driving chain is maintained. The rake is thrown into or out of gear by means of a foot-lever, Z, acting on the sprocket-wheel U. A spring, $z$, tends to keep the rake in gear when not held out of gear by the lever. The operation of the rake and reel is fully described in the patent hereinbefore recited.

We claim as of our own invention—

1. The combination of the main frame, the coupling-sleeve, the finger-beam, the drag-bar attached to the finger-beam at one end, and pivoted on the coupling-sleeve at the other, the reel-post pivoted thereon, and the supplementary brace J', these members being constructed and operating substantially as set forth, whereby the reel-post is firmly braced, while free to rise and fall with the drag-bar and cutting apparatus, and to vibrate back and forth on its pivot, substantially as set forth.

2. The combination of the two main wheels, the main frame, the coupling-sleeve, the caster-wheel supporting the coupling-sleeve, the finger-beam pivoted on said sleeve, the rake post mounted on the finger-beam, the slotted rake-stale support mounted on inwardly-projecting bracket-arms on the rake-post, and the rake-arm, these members being constructed and operating in combination substantially as set forth.

3. The combination of the hinged finger-beam, the vibrating sweep-rake mounted thereon, the hinged drag-bar, and the reel mounted on said drag-bar, and vibrating in unison with the rake, substantially as set forth.

In testimony whereof we have hereunto subscribed our names.

D. S. MORGAN.
THOMAS MOTLEY.

Witnesses:
CHAS. F. MULLER,
E. F. LAMB.